(12) United States Patent
Moisuc et al.

(10) Patent No.: US 10,984,845 B2
(45) Date of Patent: Apr. 20, 2021

(54) PROTECTION OF A MICROCONTROLLER

(71) Applicants: STMicroelectronics (Rousset) SAS, Rousset (FR); STMicroelectronics (Alps) SAS, Grenoble (FR)

(72) Inventors: Diana Moisuc, Saint Egreve (FR); Christophe Laurencin, Peypin (FR)

(73) Assignees: STMicroelectronics (Rousset) SAS, Rousset (FR); STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 16/729,056

(22) Filed: Dec. 27, 2019

(65) Prior Publication Data

US 2020/0211607 A1 Jul. 2, 2020

(30) Foreign Application Priority Data

Dec. 28, 2018 (FR) ...................................... 1874293

(51) Int. Cl.
*G11C 8/20* (2006.01)
*G11C 16/22* (2006.01)
*H04B 3/52* (2006.01)

(52) U.S. Cl.
CPC ................ *G11C 8/20* (2013.01); *G11C 16/22* (2013.01); *H04B 3/52* (2013.01)

(58) Field of Classification Search
CPC ............ H04L 63/1433; H04L 63/1441; H04B 17/327; H04B 17/3913; H04B 3/52; G11C 16/225; G11C 16/22; G11C 8/20
USPC ........................................................ 375/257
See application file for complete search history.

(56) References Cited

U.S. PATENT DOCUMENTS

| | | | |
|---|---|---|---|
| 2004/0105324 A1* | 6/2004 | Sakurai .............. | G11C 16/3404 365/200 |
| 2007/0226795 A1* | 9/2007 | Conti .................... | G06F 21/554 726/22 |
| 2011/0010775 A1* | 1/2011 | Modave ................ | H01L 27/115 726/26 |
| 2012/0124680 A1 | 5/2012 | Danger et al. | |
| 2017/0286682 A1* | 10/2017 | Stappert ................ | G06F 21/567 |
| 2017/0293019 A1* | 10/2017 | Caldwell .................. | G01S 7/38 |
| 2018/0349600 A1 | 12/2018 | Elenes et al. | |
| 2020/0025834 A1* | 1/2020 | Okamoto ............. | G11C 29/021 |
| 2020/0043868 A1* | 2/2020 | Apte ..................... | H01L 23/576 |

OTHER PUBLICATIONS

Hillebold, Christoph, "Compiler-Assisted Integrity against Fault Injection Attacks", Master's Thesis, Graz University of Technology, Dec. 2014, 147 pages.
BREIER, Jakub et al., "An Electromagnetic Fault Injection Sensor using Hogge Phase-Detector", IEEE 18th International Symposium on Quality Electronic Design, Mar. 14-15, 2017, 6 pages.

* cited by examiner

*Primary Examiner* — Emmanuel Bayard
(74) *Attorney, Agent, or Firm* — Slater Matsil, LLP

(57) ABSTRACT

In an embodiment, a method for protecting an electronic circuit includes: detecting a malfunction of the electronic circuit; executing a plurality of waves of countermeasures without interrupting an operation of the electronic circuit; and triggering a reset of the electronic circuit after executing the plurality of waves of countermeasures. An interval between two waves of countermeasures of the plurality of waves of countermeasures is variable.

26 Claims, 4 Drawing Sheets

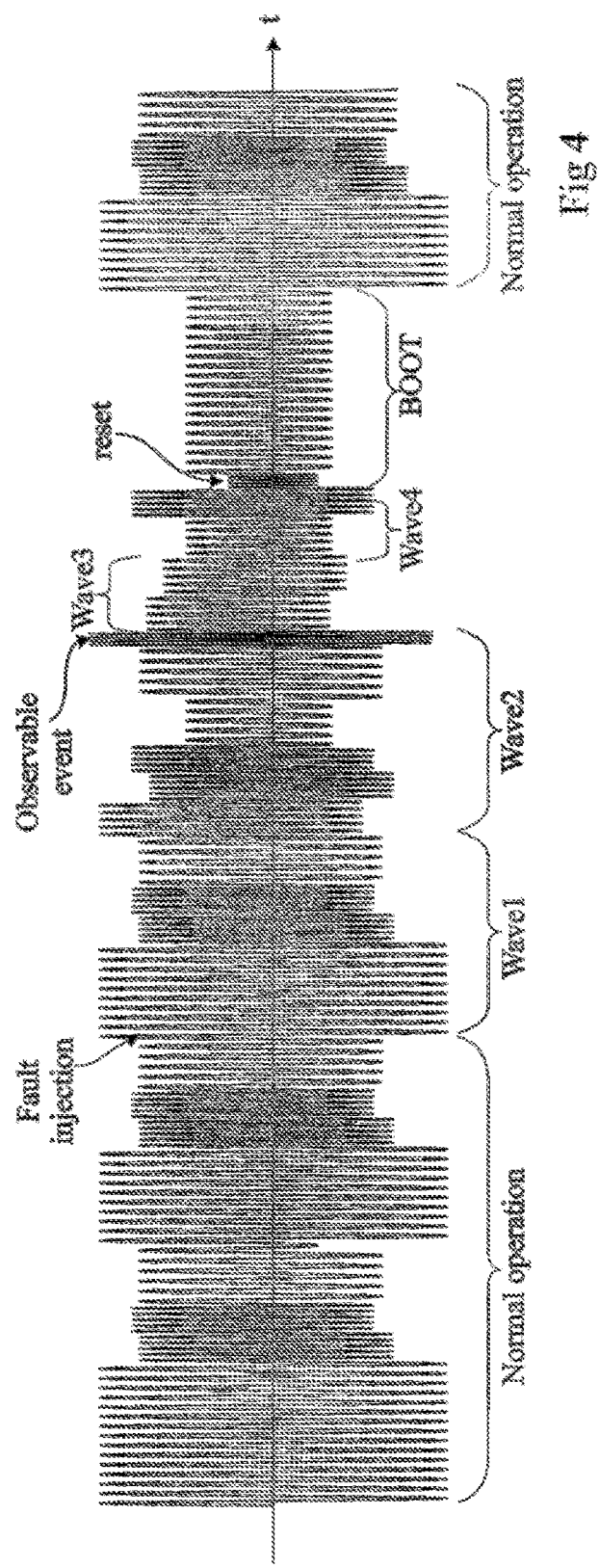

PROTECTION OF A MICROCONTROLLER

CROSS-REFERENCE TO RELATED APPLICATIONS

This application claims priority to French Patent Application No. 1874293, filed on Dec. 28, 2018, which application is hereby incorporated herein by reference.

TECHNICAL FIELD

The present disclosure relates generally to an electronic system and method, and, in particular embodiments, to protection of a microcontroller.

BACKGROUND

Certain electronic circuits handle data or execute algorithms or programs for which one wishes to reserve access to authorized users or circuits. One generally refers in such cases to secret data or encryption algorithms using so-called secret keys.

In order to unlock the secrets of such circuits and, for example, discover the handled secret quantities or data, a category of attacks consists of injecting permanent or temporary faults into the circuit in order to be able to analyze its reaction. These are, for example, analyses by hidden channels that analyze the power consumption of the circuit (analysis of the power consumption of SPA—Simple Power Analysis—type or of DPA—Differential Power Analysis—type), its electromagnetic radiation, etc. They can also be analyses of the response of the circuit (of its inputs-outputs), etc.

The injection of faults is carried out more and more often without using the inputs and outputs of the circuit but by modification of internal states, for example by using a laser (FIB—Focused Ion Beam—attacks), by electrical or electromagnetic disruption, or in a more intrusive manner by forcing certain internal states by physically cutting off or diverting electrical paths. Some of these attacks call for preliminary treatments for the elimination of layers (backside attacks) or the realization of windows in order to access the active layers.

In electronic circuits, for example so-called secure microcontrollers, the circuit is equipped with mechanisms for countering any attacks or, at the very least, limiting their effects. In particular, the objective of the countermeasures is to prevent the attacker from managing to extract secret data or quantities from the protected circuit.

Some secure microcontrollers reset the circuit when an attempted attack is detected. Such a reset may prevent the attacker from being able to extract sensitive information. However, a difficulty is that by carrying out the attack several times in a localized manner, the attacker may be able to identify the zone of the microcontroller where the circuits that trigger the reset and/or the conductors that convey the reset signals can be found. Once this identification occurs, the attacker may be able to thwart the reset and the microcontroller is thus no longer secure.

SUMMARY

Some embodiments relate to a countermeasure against attacks by fault injection.

Some embodiments relate to a category of countermeasures that reset the circuit when an attempted attack is detected.

Some embodiments relate to a method and a circuit for protecting against attacks by fault injection.

Some embodiments relate to a method for protecting an electronic circuit, comprising the steps of:
  detecting a malfunction;
  executing a plurality of waves of countermeasures without interrupting the operation of the circuit, the interval between two waves of countermeasures being variable; and
  triggering a reset of the circuit.

One embodiment provides a microcontroller comprising:
  at least one detector of a malfunction;
  a circuit for processing signals supplied by the at least one detector, intended to execute a plurality of waves of countermeasures without interrupting the operation of the circuit, the interval between two waves of countermeasures being variable; and
  a circuit intended to trigger a reset of the microcontroller.

According to an embodiment, the variable interval is random. In some embodiments, the variable interval is longer than a predetermined minimum time and shorter than a predetermined maximum time.

According to an embodiment, a first group of waves does not comprise a non-maskable interrupt.

According to an embodiment, the first group comprises:
  blocking writing in a memory;
  blocking all or part of the outputs of the circuit; and
  regenerating cryptographic keys.

According to an embodiment, a second group of waves of countermeasures comprises one or more non-maskable interrupts.

According to an embodiment, the number of countermeasure waves varies from one execution to another.

According to an embodiment, the number of countermeasures per wave varies from one execution to another.

According to an embodiment, the waves of countermeasures implement, at each detection of a malfunction, the following successive steps:
  blocking any programming of the non-volatile memory;
  blocking the outputs of the microcontroller;
  waiting for a first duration, which is preferably random;
  generating a non-maskable interrupt of the program executed by the microcontroller;
  waiting for a second duration, which is preferably random; and
  in parallel, requesting a reset and requesting the deactivation of the main clock of the microcontroller.

In some embodiments, the first and second duration, although random, may be at least longer than a predetermined minimum time, and shorter than a predetermined maximum time. In some embodiments, a particular ratio between the first duration and the second duration may be maintained. In other embodiments, the ratio between the first duration and the second duration may be variable.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 4 illustrates, very schematically and in the form of a time chart, by way of an example of an electromagnetic radiation signature of a circuit of the type shown in FIG. 1, an embodiment of the described method of protection.

DETAILED DESCRIPTION OF ILLUSTRATIVE EMBODIMENTS

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail. In particular, the applications as well as the functions implemented by the protected electronic circuit have not been described in detail, the described protective mechanisms being compatible with the applications and functions of conventional circuits. Furthermore, detectors of intrusions or attacks have not been described in detail, the described embodiments relating to countermeasures and being compatible with any conventional detector.

Unless indicated otherwise, when reference is made to two elements that are connected together, this means a direct connection without any intermediate elements other than conductors, and when reference is made to two elements that are linked or coupled together, this means that these two elements can be connected or be linked or coupled by way of one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10%, and preferably within 5%.

Figure 1:
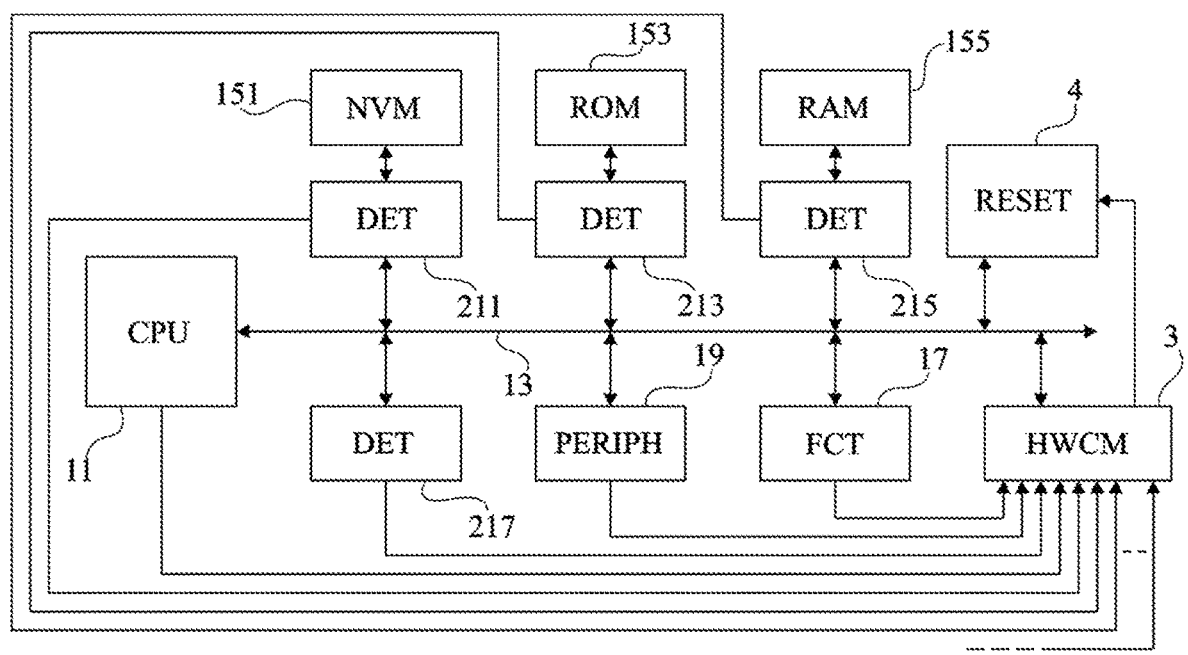
FIG. 1 illustrates an example electronic circuit of the type to which the described embodiments apply.

FIG. 1 illustrates an example electronic circuit of the type to which the described embodiments apply.

The circuit of FIG. 1 is, for example, a secure microcontroller 1.

Such a microcontroller is based on a microprocessor or central processing unit 11 (CPU), capable of communicating, via one or more buses 13, with various other circuits with which it is integrated. For the sake of simplification, one bus 13 has been illustrated in FIG. 1. However, in most cases, a plurality of buses—respectively address, data and command buses—would be present. Moreover, some components of the microcontroller can also communicate directly between themselves.

Typically, the microcontroller 1 integrates memory circuits, for example one or more rewritable non-volatile memories 151 (NVM), one or more read-only memories 153 (ROM), and/or one or more volatile memories 155 (RAM). The microcontroller can also integrate various hardware functions or circuits, represented by a block 17 (FCT), which may implemented, for example, a cryptographic function, specific calculation functions, wired and/or wireless input/output interfaces, etc.

Depending on the application, the microcontroller 1 may also communicate, via the one or more buses 13, with one or more internal or external peripheral devices, represented by a block 19 (PERIPH), for example, detectors of ambient characteristics (pressure, temperature, etc.) or others.

In a secure microcontroller application, the secure microcontroller aims to ensure that it is always in a secure state, in which secrets contained in the system are not divulged. For this purpose, the circuit or microcontroller 1 includes various hardware and/or software detectors 211, 213, 215, and 217 (DET) that are configured to detect attempts to attack the content of the microcontroller 1 or to detect a random or voluntary malfunction. Such detectors may take various forms. They are, for example, hardware detectors capable of detecting an electrical or electromagnetic disturbance after the circuit has been subjected to a structural modification such as the elimination of layers present at the backside. They can also be hardware detectors of laser attacks. They can further be software detectors capable of detecting an operational malfunction of certain functions of the circuit. The detectors may or may not be associated with specific functions of the microcontroller.

In FIG. 1, the case is illustrated where detectors 211, 213 and 215 are inserted between the memories 151, 153, 155 and the bus 13 and are thus dedicated to the corresponding memory, together with the case of a detector 217 independent of a particular function. Furthermore, the functions 17 and/or the peripheral devices 19 of the circuit 1 may also be associated with detectors (not shown).

All disturbance detectors with the object of detecting a fault potentiality are electrically linked (in a wired manner) to a hardware and/or software unit 3 (HWCM) for reacting or for implementing a countermeasure to the suspected attack. The role of the unit 3 is, as will be seen in the following, to act on a plurality of functions of the circuit 1 as well as to trigger a resetting of the circuit 1. In FIG. 1, a reset circuit 4 (RESET) separate from the other circuits and functions is represented. The reset function may, as a variant, be located at the central processing unit 11.

The role of the reset is, in the presence of an alarm indicating a malfunction, whether accidental or voluntary (attack), to ensure that the circuit 1 remains in a secure state. The reset meets this objective insofar as all the functions restart in their original secure state. This reset prevents sensitive zones of the circuit from becoming accessible as the result of an attack.

However, the reaction of the system that manifests itself by a reset constitutes an indication that is observable by the attacker, revealing to the attacker that his attack has modified the behavior of the circuit.

In particular, any reaction of the circuit, for example a power consumption signature, radiation signature, etc., that is different from that which occurs during normal operation provides the attacker with information. If an attacker identifies a reaction of the circuit, the reaction tells him that his attack has caused an atypical behavior of the circuit. The attacker can thus carry out a further attack consisting of inhibiting the reaction of the system. For example, by identifying the zone of the circuit that triggers the reset, the attacker can intervene so as to prevent its operation. It may then be sufficient for the attacker to re-execute his first attack, as the circuit is no longer in a safe or secure state. The resetting of a microcontroller is, furthermore, particularly identifiable from a power consumption or electromagnetic signature.

More generally, the secure circuit to which the described embodiments apply can be any circuit or system integrating at least one circuit for detecting an attempted attack and a reactive circuit (countermeasure). Indeed, the described embodiments may not modify the conventional methods or ways of detecting a potential attack or disturbance. They relate to a countermeasure once an attack has been detected and apply regardless of the detection mechanisms used (photonic, electric, magnetic, etc.; local or distributed in the circuit, hardware or software, etc.).

Figure 2:
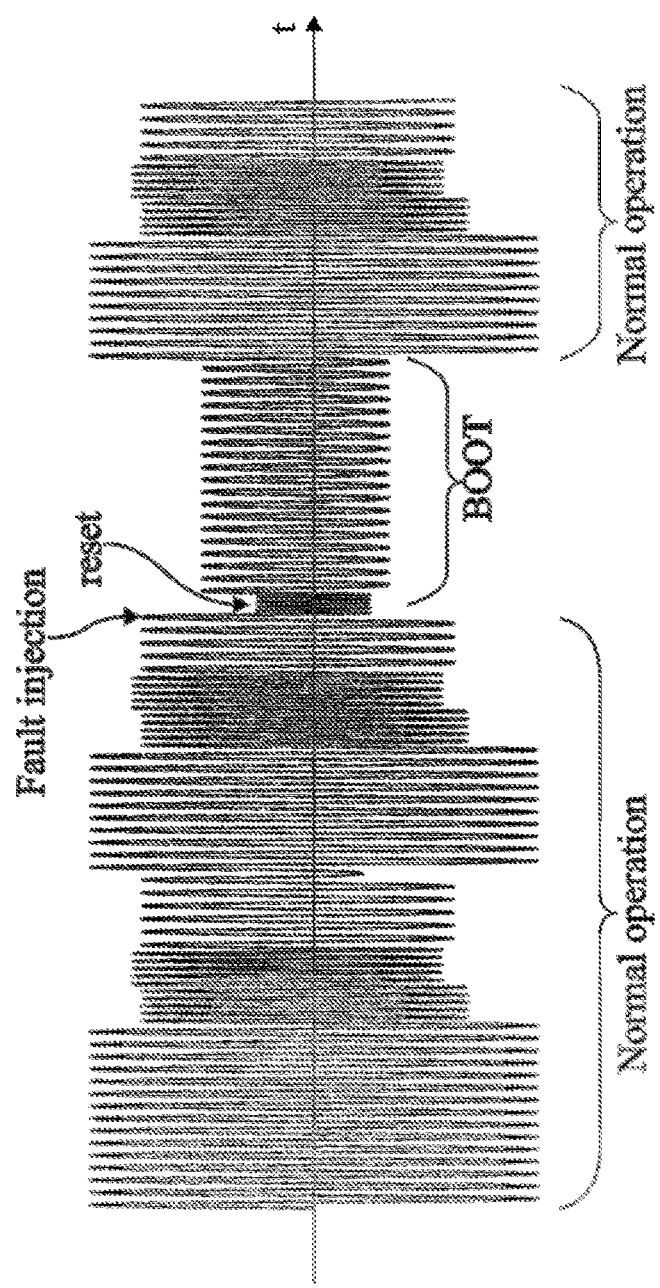
FIG. 2 illustrates, very schematically and in the form of a time chart, an example of a conventional electromagnetic signature of a secure microcontroller during the detection of a potential attack.

FIG. 2 illustrates, very schematically and in the form of a time chart, an example of a conventional electromagnetic signature of a secure microcontroller during the detection of a potential attack.

An initial normal operation (Normal operation) of the microcontroller is assumed.

During a fault injection (Fault injection), or more generally an action or operation detected as abnormal by one of the detectors DET (FIG. 1), the circuit 3 normally immediately triggers a reset (reset) of the microcontroller. The latter is thus restarted (BOOT), then the microcontroller resumes its normal operation (Normal operation). The restarting BOOT of the microcontroller may be easy to identify as it is generally of a fixed duration.

In accordance with the described embodiments, in the event of an attack or malfunction detected by one of the detectors DET, the unit 3 does not immediately trigger a reset of the microcontroller 1. Instead, the unit or circuit 3 triggers countermeasures in waves that resemble a normal operation of the microcontroller 1. In particular, the operation of the program being executed by the microcontroller is preferably continued. In order to complete protection, a reset is carried out, but it occurs after a delay with respect to the detection of the attack and the delay is variable from one execution to another. Preferably, the countermeasures which precede the reset are chosen in order to nevertheless secure the microcontroller. Still preferentially, the first countermeasures that follow the detection of an attack are chosen so as not to constitute an observable reaction, but to resemble a normal operation. By preventing an immediate reaction via a non-maskable interrupt such as a reset, the attacker is prevented from finding the relevant area in order to carry out his second attack (blocking a reset).

The waves of countermeasures implemented between the detection of the attack and the reset can be divided into two categories.

A first category relates to countermeasures not observable by the attacker, but which nevertheless secure the microcontroller. These are, for example, a blocking of any programming in the non-volatile memory 151 or a blocking of the inputs-outputs of the microcontroller. According to another example, keys used in a cryptographic process are regenerated.

A second category relates to countermeasures that are observable. These are, for example, non-maskable interrupts (NMI) which, unlike standard interrupt requests (IRQ) which can accompany the countermeasures of the first category, will be identified by the attacker. The non-maskable interrupts can be followed by a software action, for example, the launching of a specific program (for example, which deletes keys, empties the volatile memory, etc.).

According to a preferred embodiment, in the event of a detection of an attack, the circuit 3 implements one or more waves of first-category countermeasures, followed by one or more waves of second-category countermeasures. Each wave of countermeasures comprises one or more reactions of the circuit.

Figure 3:
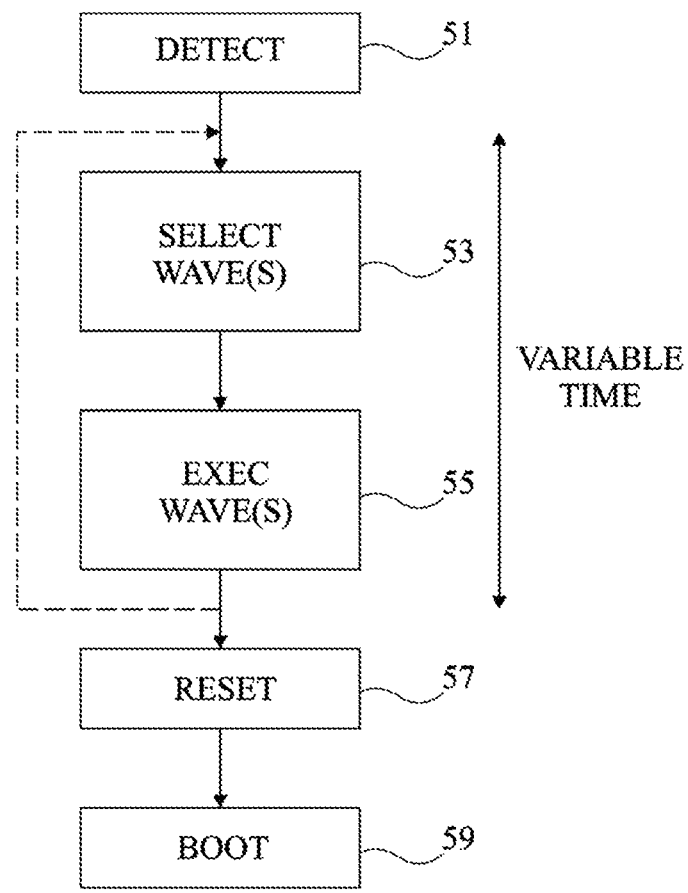
FIG. 3 illustrates, in the form of blocks, an embodiment of a method of protection.

FIG. 3 illustrates, in the form of blocks, an embodiment of a method of protection.

This method is implemented, for example, by the unit or function 3 (FIG. 1). This unit preferably executes a sequence of instructions corresponding to the implementation of the various waves of countermeasures, in the manner of a program. The sequence of instructions can be stored permanently for a hardware execution (wired logic) or be a program stored, for example, as read-only memory.

During the detection of an attack (block 51, DETECT), the circuit 3 selects (block 53, SELECT WAVE(S)) and executes (block 55, EXEC WAVE(S)) one or more waves of countermeasures placing the system in a safe state. These are, for example, as indicated in the foregoing, locking certain zones of the non-volatile memory, blocking certain inputs-outputs of the microcontroller, changing cryptographic process keys, etc. These countermeasures, arbitrarily called first category, preferably do not generate any events that can be observed by the attacker. In particular, the operation of the application being executed by the microcontroller may continue and is not interrupted.

According to an embodiment, a reset (block 57, RESET) of the circuit, followed by a restart (block 59, BOOT) is triggered at the end of these waves of countermeasures.

According to a preferred embodiment, the circuit 3 triggers other waves of countermeasures (dotted loop shown in FIG. 3), which can include non-maskable interrupts. These countermeasures manifest themselves by events that are observable by the attacker. For example, these countermeasures gradually restrict the functions of the microcontroller. These countermeasures, arbitrarily called second category, can be broken up or mixed with first-category countermeasures, and be of a hardware or software type.

FIG. 4 illustrates, very schematically and in the form of a time chart, by way of an example radiation signature of a microcontroller of the type shown in FIG. 1, an embodiment of the described method of protection.

The time chart of FIG. 4 can be compared to the time chart of FIG. 2 in order to understand the effect of the described countermeasure embodiment.

As in the foregoing, an initial normal operation (Normal operation) of the microcontroller is assumed.

However, at the detection of a fault injection (Fault injection), the circuit 3 does not immediately trigger a reset. Instead, it commands a number of processes triggering responses in terms of electromagnetic radiation (Wave1, Wave2) that resembles a continuation of the normal operation of the microcontroller. Thus, the attacker considers that the zone that he has attacked was not a sensitive zone inasmuch as the attacker may have the impression that his attack has not triggered a reaction. In the example shown in FIG. 3, two waves, Wave1 and Wave2, of preferably first-category countermeasures are assumed. However, the number of countermeasures and their duration preferably varies from one execution to another (for example, by a random selection within a set of countermeasures).

According to the embodiment illustrated by FIG. 4, the circuit 3 then triggers a non-maskable interrupt. This interrupt is, however, not a reset. It nevertheless manifests itself by an observable event (Observable event) on the electromagnetic signature of the circuit. According to this embodiment, this event is followed by other waves of first- or second-category countermeasures (Wave3, Wave4). A reset of the circuit occurs, for example, after this second set of waves. In a usual manner, the reset is followed by a restart (BOOT), and then by a period of normal operation (Normal operation).

An advantage of the method illustrated by FIGS. 3 and 4 is that it may fool the attacker regarding the effects of his attack. Indeed, by varying the operations executed between the detection of the attack and the reset, as well as their duration, the reaction of the microcontroller (its reset) is detected at a time when it is more difficult to make the connection with the event that triggered the countermeasure. In particular, in the event that the first attack constitutes a sweeping of different zones of the circuit in order to make it react to the attack, it becomes difficult to locate the zone that triggered the reaction, thus the zone containing secret information.

Preferably, the order in which the countermeasures are executed is chosen so as to delay the detection of the reaction of the circuit by the attacker.

Preferably, the duration of the countermeasure waves is variable from one execution to another (e.g., from one execution to another within the same device and/or from device to device) and is, for example, random within a given range of durations.

As an example embodiment, a total duration comprised between 100 ns and 1 ms is provided between the detection of the attack and the reset. The chosen duration is short enough so as to avoid making the circuit vulnerable during the execution of the method of protection.

According to a particular example embodiment, the method successively implements the following countermeasure waves:
blocking any programming of the non-volatile memory;
blocking the outputs of the microcontroller;
waiting for a first duration, which is preferably random;
generating a non-maskable interrupt of the program executed by the microcontroller;
waiting for a second duration, which is preferably random; and
in parallel, requesting a reset and requesting the deactivation of the main clock of the microcontroller.

In some embodiments, the first and second duration, although random, may be at least longer than a predetermined minimum time, and shorter than a predetermined maximum time. In some embodiments, a particular ratio between the first duration and the second duration may be maintained. In other embodiments, the ratio between the first duration and the second duration may be variable.

An advantage of some embodiments is that the reaction of the protected circuit is more difficult to detect by an attacker.

A further advantage of some embodiments is that the placement of the circuit in a state of protection (as a result of the detection of an attack) is not observable on the electromagnetic or power consumption signature of the circuit.

A further advantage of some embodiments is that, by using the random durations between countermeasures, the observable events occur at random times.

A further advantage of some embodiments is that a successful attack cannot be repeated on a different circuit of the same type or on the same circuit, as the reaction of the circuit will be different from a hardware and software point of view.

A further advantage of some embodiments is that by maintaining the operation of the program executed by the circuit during the reaction, many points where the attack could have proved effective may be considered irrelevant by the attacker.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove, in particular as far as the choice of reactions (countermeasures) executed by the microcontroller as a result of the detection of an attack is concerned.

What is claimed is:

1. A method for protecting an electronic circuit, the method comprising:
detecting a malfunction of the electronic circuit;
in response to detecting the malfunction, executing a plurality of waves of countermeasures without interrupting an operation of the electronic circuit, wherein a first wave of countermeasures of the plurality of waves of countermeasures implements the step of blocking programming of a non-volatile memory of the electronic circuit, or the step of blocking an input or an output of the electronic circuit, or the step of regenerating a cryptographic key, wherein a second wave of countermeasures of the plurality of waves of countermeasures implement the step of generating a non-maskable interrupt of a program executed by the electronic circuit, and wherein an interval between the first and second waves of countermeasures is variable; and
triggering a reset of the electronic circuit after executing the plurality of waves of countermeasures.

2. The method of claim 1, wherein a first group of waves of countermeasures of the plurality of waves of countermeasures does not comprise a non-maskable interrupt.

3. The method of claim 2, wherein the first group of waves of countermeasures comprises:
blocking writing in a memory;
blocking all or a part of an output of the electronic circuit; or
regenerating cryptographic keys.

4. The method of claim 2, wherein a second group of waves of countermeasures of the plurality of waves of countermeasures comprises a non-maskable interrupts.

5. The method of claim 1, wherein the variable interval is random.

6. The method of claim 5, wherein the variable interval is longer than a predetermined minimum time and shorter than a predetermined maximum time.

7. The method of claim 1, wherein a number of countermeasures waves of the plurality of waves of countermeasures varies from one execution to another.

8. The method of claim 1, wherein a number of countermeasures per wave of countermeasures of the plurality of waves of countermeasures varies from one execution to another.

9. The method of claim 1, wherein the plurality of waves of countermeasures implement, at each detection of a malfunction of the electronic circuit, the steps of:
blocking programming of a non-volatile memory of the electronic circuit;
blocking an output of the of the electronic circuit;
after blocking programming and after blocking the output of the electronic circuit, waiting for a first duration;
after waiting for the first duration, generating a non-maskable interrupt of a program executed by the electronic circuit;
after generating the non-maskable interrupt, waiting for a second duration;
requesting the reset of the electronic circuit; and
requesting a deactivation of a main clock of the electronic circuit.

10. The method of claim 9, wherein the first duration and the second duration are random.

11. The method of claim 10, wherein the first and second durations are longer than a predetermined minimum duration and shorter than a predetermined maximum duration.

12. The method of claim 9, wherein the electronic circuit is a microcontroller.

13. The method of claim 1, further comprising requesting a deactivation of a main clock of the electronic circuit after generating the non-maskable interrupt.

14. The method of claim 1, wherein the first wave of countermeasures implements the step of blocking programming of the non-volatile memory.

15. The method of claim 1, further comprising, after generating the non-maskable interrupt, deleting a cryptographic key or emptying the non-volatile memory.

16. An electronic circuit comprising:
a detector configured to detect a malfunction;
a processing circuit configured to process signals supplied by the detector, and configured to execute, in response to the signals supplied by the detector, a plurality of waves of countermeasures without interrupting an operation of the electronic, circuit, wherein a first wave of countermeasures of the plurality of waves of countermeasures implements the step of blocking programming of a non-volatile memory of the electronic circuit, or the step of blocking an input or an output of the electronic circuit, or the step of regenerating a cryptographic key, wherein a second wave of countermeasures of the plurality of waves of countermeasures implement the step of generating a non-maskable interrupt of a program executed by the electronic circuit, and wherein an interval between the first and second waves of countermeasures is variable; and
a reset circuit configured to trigger a reset of the electronic circuit.

17. The electronic circuit of claim 16, further comprising a second detector configured to detect a second malfunction, wherein the processing circuit is further configured to process signals supplied by the second detector and configured to execute, in response to the signals supplied by the second detector, the plurality of waves of countermeasures.

18. The electronic circuit of claim 16, wherein a first group of waves of countermeasures of the plurality of waves of countermeasures does not comprise a non-maskable interrupt.

19. The electronic circuit of claim 18, wherein the processing circuit is configured to, in the first group of waves of countermeasures:
block writing in a memory of the electronic circuit;
block all or a part of an output of the electronic circuit; or
regenerate cryptographic keys.

20. The electronic circuit of claim 18, wherein a second group of waves of countermeasures of the plurality of waves of countermeasures comprises a non-maskable interrupts.

21. The electronic circuit of claim 16, wherein the variable interval is random.

22. The electronic circuit of claim 16, wherein a number of countermeasure waves of the plurality of waves of countermeasures varies from one execution to another.

23. The electronic circuit of claim 16, wherein a number of countermeasures per wave of countermeasures of the plurality of waves of countermeasures varies from one execution to another.

24. The electronic circuit of claim 16, wherein the processing circuit is configured to, at each detection of a malfunction:
block programming of a non-volatile memory of the electronic circuit;
block an output of the electronic circuit;
after blocking programming of the non-volatile memory and after blocking the output of the electronic circuit, wait for a first random duration;
after waiting for the first random duration generate a non-maskable interrupt of a program executed by the electronic circuit;
after generating the non-maskable interrupt, wait for a second random duration; and
after waiting for the second random duration, request the reset of the electronic circuit and request a deactivation of a main clock of the electronic circuit.

25. The electronic circuit of claim 16, wherein the electronic circuit comprises a microcontroller.

26. A method comprising:
detecting a malfunction of an electronic circuit;
in response to detecting the malfunction, execute a first countermeasure without interrupting an operation of the electronic circuit, wherein the first countermeasure does not trigger a non-maskable interrupt, and wherein the first countermeasure implements the step of blocking programming of a non-volatile memory of the electronic circuit, or the step of blocking an input or an output of the electronic circuit, or the step of regenerating a cryptographic key;
after executing the first countermeasure, executing a second countermeasure that triggers a non-maskable interrupt, wherein a time between executing the first countermeasure and the second countermeasure is variable; and
after executing the second countermeasure, triggering a reset of the electronic circuit.

* * * * *